(12) United States Patent
Kawano

(10) Patent No.: US 10,445,570 B2
(45) Date of Patent: Oct. 15, 2019

(54) INFORMATION PROCESSING APPARATUS

(71) Applicant: FUJI XEROX CO., LTD., Tokyo (JP)

(72) Inventor: Hiroyuki Kawano, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 56 days.

(21) Appl. No.: 15/892,894

(22) Filed: Feb. 9, 2018

(65) Prior Publication Data

US 2018/0276460 A1 Sep. 27, 2018

(30) Foreign Application Priority Data

Mar. 21, 2017 (JP) ................. 2017-054143

(51) Int. Cl.
| | | |
|---|---|---|
| *G06K 9/00* | (2006.01) | |
| *G06T 7/11* | (2017.01) | |
| *G06T 7/73* | (2017.01) | |
| *G06T 7/62* | (2017.01) | |
| *G06T 7/174* | (2017.01) | |
| *G06K 9/46* | (2006.01) | |
| *G06K 9/62* | (2006.01) | |

(52) U.S. Cl.
CPC ..... *G06K 9/00463* (2013.01); *G06K 9/00483* (2013.01); *G06T 7/11* (2017.01); *G06T 7/174* (2017.01); *G06T 7/62* (2017.01); *G06T 7/74* (2017.01); *G06K 9/4671* (2013.01); *G06K 9/623* (2013.01); *G06T 2207/30176* (2013.01)

(58) Field of Classification Search
CPC .......... G06K 9/00463; G06K 9/00483; G06K 9/623; G06K 9/4671; G06T 7/174; G06T 7/62; G06T 7/74; G06T 7/11; G06T 2207/30176
See application file for complete search history.

(56) References Cited

U.S. PATENT DOCUMENTS

| | | | |
|---|---|---|---|
| 2008/0225316 A1* | 9/2008 | Yamamoto | ......... G06K 9/00456 |
| | | | 358/1.9 |
| 2016/0125265 A1* | 5/2016 | Xie | ......... G06F 16/50 |
| | | | 382/209 |

FOREIGN PATENT DOCUMENTS

| | | |
|---|---|---|
| JP | 2005-346390 A | 12/2005 |
| JP | 2011-257963 A | 12/2011 |
| JP | 2015-106384 A | 6/2015 |

* cited by examiner

*Primary Examiner* — Phuoc Tran
(74) *Attorney, Agent, or Firm* — Sughrue Mion, PLLC

(57) ABSTRACT

An information processing apparatus includes a detecting unit that detects a feature location in an image, a sorting unit that sorts regions in the image into plural regions different in terms of attribute, a memory that stores a rule that associates an attribute of a region with a priority of the region, and a determining unit that checks the feature locations detected from two images against each other, and determines a similarity between the two images by accounting for, in check results, the priority of the region associated by the rule with the attribute of the region containing the feature locations.

20 Claims, 11 Drawing Sheets

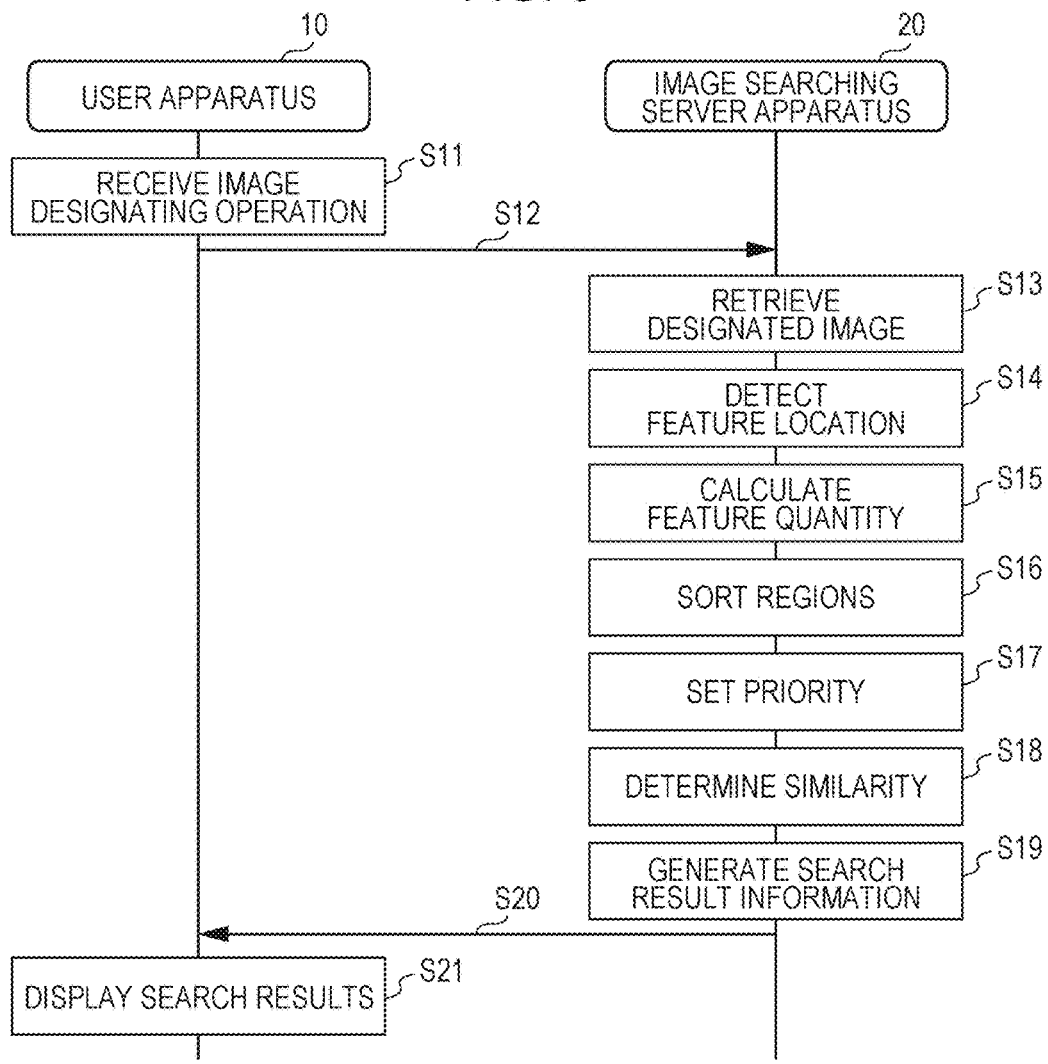

FIG. 9

| POSITION OF REGION | PRIORITY |
|---|---|
| TOP LEFT | 1 |
| TOP RIGHT, BOTTOM LEFT | 2 |
| BOTTOM RIGHT | 3 |

FIG. 10

| POSITION OF REGION | PRIORITY CORRECTION VALUE |
|---|---|
| TOP LEFT | −1 |
| TOP RIGHT, BOTTOM LEFT | 0 |
| BOTTOM RIGHT | +1 |

FIG. 11

| DEVIATION IN POSITION BETWEEN REGIONS HAVING COMMON ATTRIBUTE | PRIORITY |
|---|---|
| BELOW THRESHOLD VALUE Th1 | 1 |
| EQUAL TO OR ABOVE THRESHOLD VALUE Th1 AND BELOW THRESHOLD VALUE Th2 | 2 |
| EQUAL TO OR ABOVE THRESHOLD VALUE Th2 | 3 |

FIG. 12

| SIZE OF FEATURE QUANTITY | PRIORITY |
|---|---|
| BELOW THRESHOLD VALUE Th11 | 3 |
| EQUAL TO OR ABOVE THRESHOLD VALUE Th11 AND BELOW THRESHOLD VALUE Th12 | 2 |
| EQUAL TO OR ABOVE THRESHOLD VALUE Th12 | 1 |

FIG. 13

| TYPE OF APPLICATION | ATTRIBUTE OF REGION | PRIORITY |
|---|---|---|
| BROWSER | TEXT REGION | 2 |
| | GRAPHIC REGION | 3 |
| | PICTURE REGION | 1 |
| IMAGE EDITING SOFTWARE | TEXT REGION | 3 |
| | GRAPHIC REGION | 2 |
| | PICTURE REGION | 1 |
| TEXT EDITING SOFTWARE | TEXT REGION | 1 |
| | GRAPHIC REGION | 2 |
| | PICTURE REGION | 3 |

FIG. 14

| CONTENT OF IMAGE | ATTRIBUTE OF REGION | PRIORITY |
|---|---|---|
| PRESENTATION MATERIALS | TEXT REGION | 3 |
| | GRAPHIC REGION | 2 |
| | PICTURE REGION | 1 |
| DOCUMENTS (EXCLUDING FORMS AND GRAPHICS) | TEXT REGION | 1 |
| | GRAPHIC REGION | 2 |
| | PICTURE REGION | 3 |
| FORMS AND GRAPHICS | TEXT REGION | 2 |
| | GRAPHIC REGION | 1 |
| | PICTURE REGION | 3 |
| PHOTOGRAPHS | TEXT REGION | 2 |
| | GRAPHIC REGION | 3 |
| | PICTURE REGION | 1 |

FIG. 15

| GROUP | PRIORITY CORRECTION VALUE |
|---|---|
| LARGE | −0.3 |
| MEDIUM | 0 |
| SMALL | +0.3 |

INFORMATION PROCESSING APPARATUS

CROSS-REFERENCE TO RELATED APPLICATIONS

This application is based on and claims priority under 35 USC 119 from Japanese Patent Application No. 2017-054143 filed Mar. 21, 2017.

BACKGROUND

(i) Technical Field

The present invention relates to an information processing apparatus.

(ii) Related Art

Techniques are available to calculate similarity between images through comparing feature quantities of points in the images, and to search for images having a higher degree of similarity.

SUMMARY

According to an aspect of the invention, there is provided an information processing apparatus. The information processing apparatus includes a detecting unit that detects a feature location in an image, a sorting unit that sorts regions in the image into plural regions different in terms of attribute, a memory that stores a rule that associates an attribute of a region with a priority of the region, and a determining unit that checks the feature locations detected from two images against each other, and determines a similarity between the two images by accounting for, in check results, the priority of the region associated by the rule with the attribute of the region containing the feature locations.

BRIEF DESCRIPTION OF THE DRAWINGS

Exemplary embodiment of the present invention will be described in detail based on the following figures, wherein:

FIG. 7 illustrates an example of a priority table;

FIG. 8 illustrates an example of a procedure of each apparatus in an image search process;

FIG. 9 illustrates an example of a second priority table;

FIG. 10 illustrates another example of the second priority table;

FIG. 11 illustrates an example of a third priority table;

FIG. 12 illustrates an example of a fourth priority table;

FIG. 13 illustrates an example of a modification of the first priority table;

FIG. 14 illustrates an example of the modification of the first priority table;

FIG. 15 illustrates an example of a fifth priority table;

DETAILED DESCRIPTION

Figure 1:
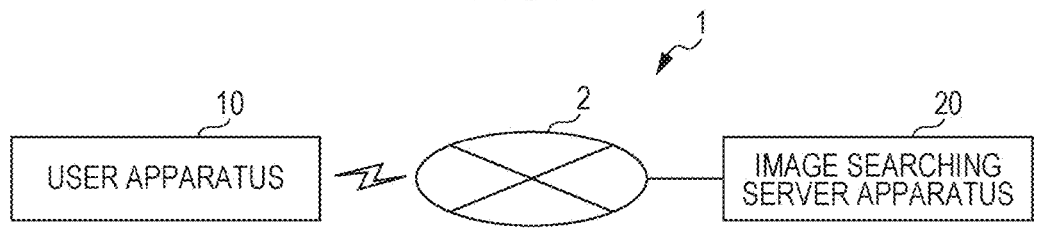
FIG. 1 illustrates a whole configuration of an image searching system of an exemplary embodiment.

FIG. 1 illustrates a whole configuration of an image searching system 1 of an exemplary embodiment. The image searching system 1 searches for an image that is similar to an image designated by a user. The image searching system 1 includes a communication network 2, a user apparatus 10, and an image searching server apparatus 20.

The communication network 2 is a communication system that includes a mobile communication network and the Internet. The communication network 2 relays data between apparatuses connected thereto. The communication network 2 connects to the image searching server apparatus 20 via wired communication, and also connects to the user apparatus 10 via radio communication. Connection to the communication network 2 may be via wired communication or radio communication.

The user apparatus 10 is an information processing apparatus used by a user, and displays an image and receives a user operation. When the user designates an image according to which similar images are searched for, the user apparatus 10 transmits the designated image to the image searching server apparatus 20. The image searching server apparatus 20 is an image processing apparatus that searches for an image that is similar to the designated image. The image searching server apparatus 20 stores the image as a search target on a storage region that is accessible from the outside via a uniform resource locator (URL).

The image searching server apparatus 20 calculates a degree of similarity between an image transmitted from the user apparatus 10 and a stored image, and transmits to the user apparatus 10, as search results, a specific number of thumbnail images arranged in the order of magnitude of similarity from a larger degree to a smaller degree and access information (information to access images, such as URLs). The user apparatus 10 displays a list of the received thumbnail images and access information. When the user selects one of the thumbnail images, the user apparatus 10 accesses the image searching server apparatus 20, and reads and displays the corresponding image thereon.

Figure 2:
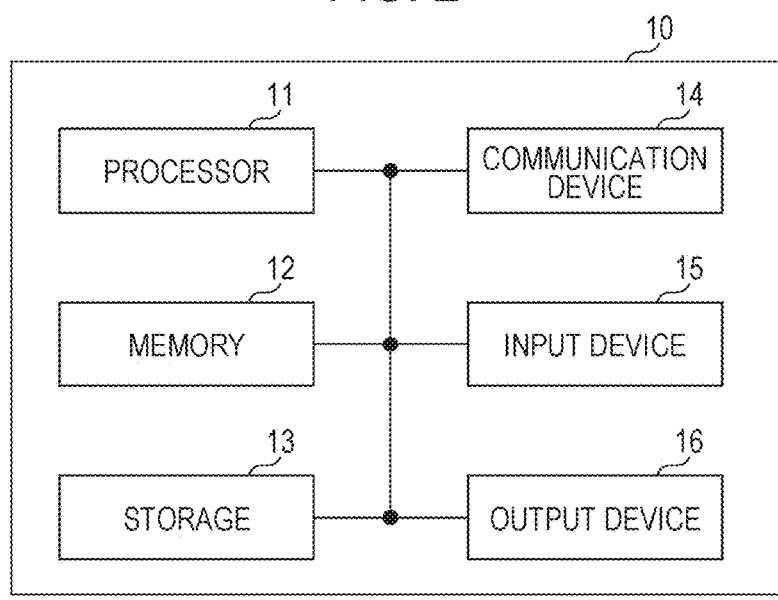
FIG. 2 illustrates a hardware configuration of a user apparatus.

FIG. 2 illustrates a hardware configuration of the user apparatus 10. The user apparatus 10 is a computer and includes the processor 11, a memory 12, a storage 13, a communication device 14, an input device 15, and an output device 16. The processor 11 includes a central processing unit (CPU) and the like, and generally controls the computer by running an operating system. The processor 11 reads programs, data, and the like from the storage 13 and the communication device 14 onto the memory 12, and performs a variety of processes in accordance with the programs and data.

The memory 12 includes a computer-readable recording medium, such as a read-only memory (ROM) or a random-access memory (RAM). The storage 13 includes a computer-readable recording medium, such as a hard disk drive or a flash memory. The communication device 14 performs communication between computers via a radio communication network. The communication device 14 performs the radio communication in compliance with standards for mobile communication or wireless local-area network (LAN).

The input device 15 receives an input from the outside. In the user apparatus 10, the input device 15 may include a touch sensor, a button, and/or a microphone. The output device 16 outputs signals to the outside. For example, the output device 16 includes a display and/or a speaker. The user apparatus 10 includes a touchscreen into which the touch sensor serving as the input device 15 and the display serving as the output device 16 are integrated.

Figure 3:
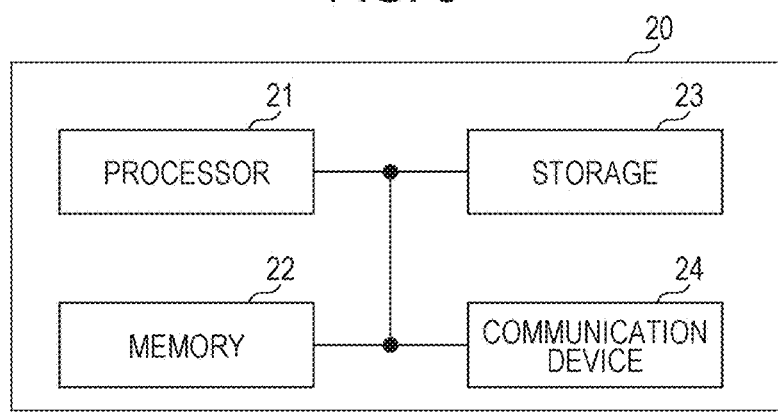
FIG. 3 illustrates a hardware configuration of an image searching server apparatus.

FIG. 3 illustrates a hardware configuration of the image searching server apparatus 20. The image searching server apparatus 20 is a computer and includes a processor 21, a memory 22, a storage 23, and a communication device 24. These elements are identical in hardware to those illustrated in FIG. 2.

The processor in each apparatus in the image searching system 1 performs the program thereof to control the elements. The functionalities described below are thus implemented.

Figure 4:
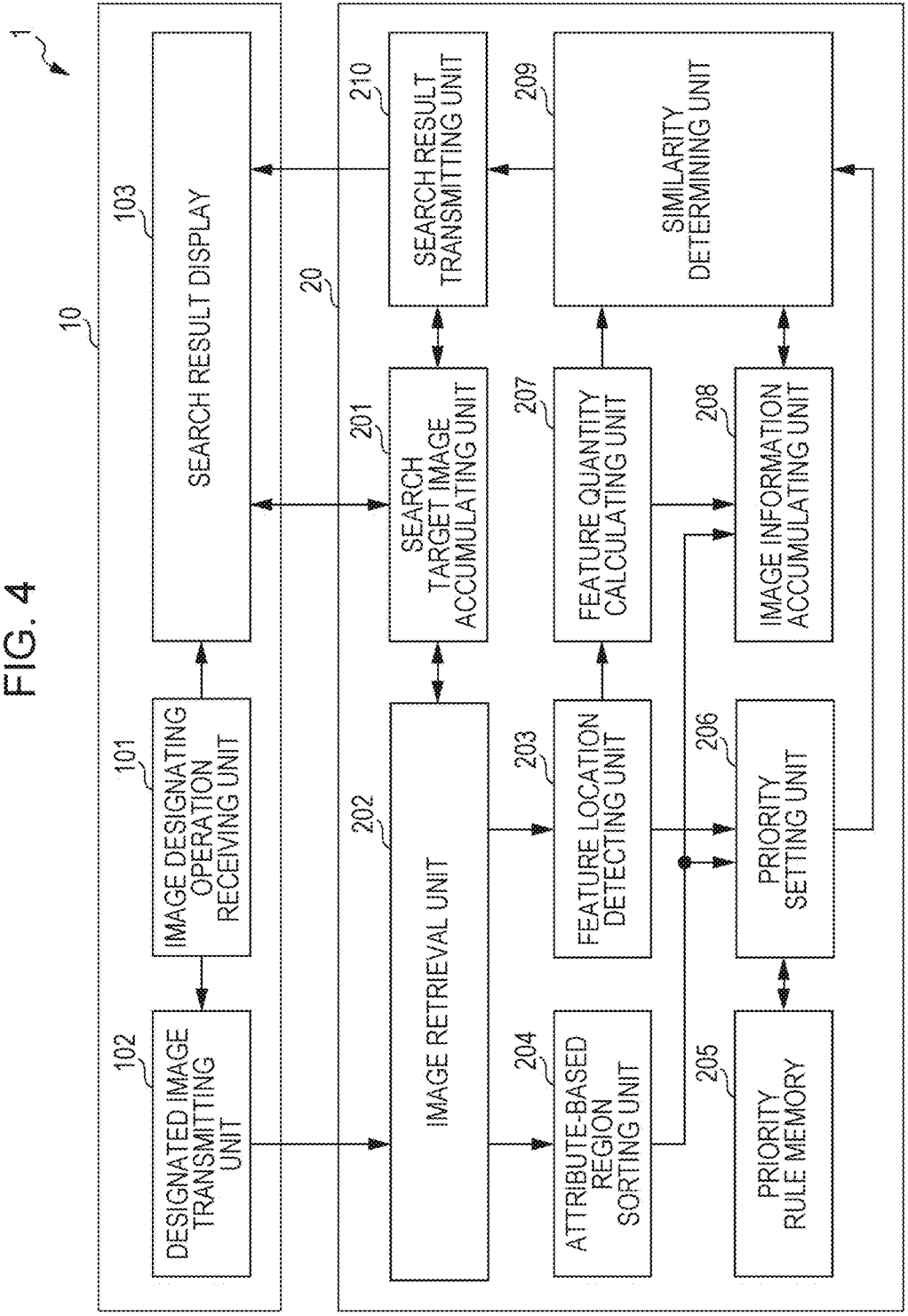
FIG. 4 illustrates a functional configuration implemented by the image searching system.

FIG. 4 illustrates a functional configuration implemented by the image searching system 1. The user apparatus 10 includes an image designating operation receiving unit 101, a designated image transmitting unit 102, and a search result display 103. The image searching server apparatus 20 includes a search target image accumulating unit 201, an image retrieval unit 202, a feature location detecting unit 203, an attribute-based region sorting unit 204, a priority rule memory 205, a priority setting unit 206, a feature quantity calculating unit 207, an image information accumulating unit 208, a similarity determining unit 209, and a search result transmitting unit 210.

The search target image accumulating unit 201 in the image searching server apparatus 20 accumulates an image serving as a search target in the image searching system 1. For example, the search target image accumulating unit 201 stores, in association with each other, data indicating an image of a business document, an image of presentation materials, and an image of graphics, and information identifying each image (the information identifying each image is a file name and path, and in the exemplary embodiment, image identification (ID)).

The search target image accumulating unit 201 separately stores images in folders, on one image on one folder basis, and allows each image to be accessed with a URL assigned thereto. The search target image accumulating unit 201 stores the URL, the image ID accessible with the URL, and the thumbnail image of the image identified by the image ID in association with each other.

The image retrieval unit 202 retrieves an image that serves as a calculation target for a feature quantity. For example, when the search target image accumulating unit 201 newly stores an image that is a search target, the search target image accumulating unit 201 sends the image and the image ID to the image retrieval unit 202. The image retrieval unit 202 retrieves the image as the search target and the image ID. The image retrieval unit 202 supplies the retrieved search target image and image ID to the feature location detecting unit 203 and the attribute-based region sorting unit 204.

The feature location detecting unit 203 has a functionality of detecting a feature location in an image, and an example of a "detecting unit" of the exemplary embodiment. The feature location in the image is an outline or a vertex (corner) of an object (a character, a graphic, a photograph, and a picture) within an image. The feature location detecting unit 203 detects the feature location in the image supplied by the image retrieval unit 202, using one of related-art image processing techniques.

The related art image processing techniques include scale-invariant feature transform (SIFT), speed-upped robust feature (SURF), ORB, accelerated KAZE (AKAZE), and histograms of oriented gradients (HOG). The feature location corresponds to the feature point in SIFT, and the feature region in HOG.

Figure 5B:
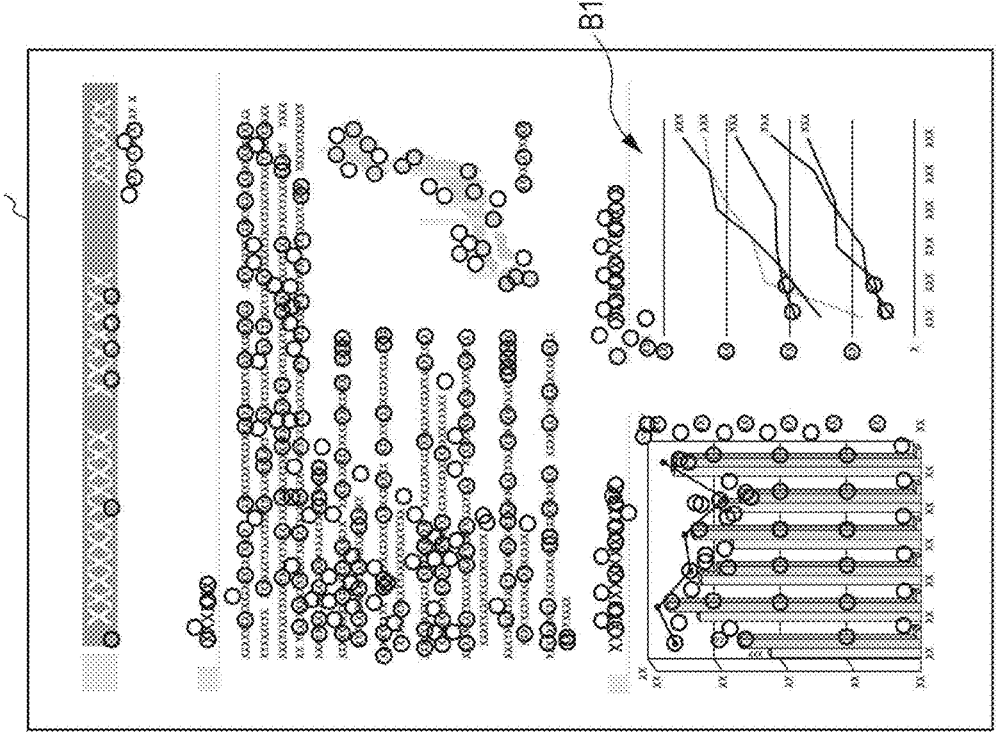
FIG. 5A and FIG. 5B illustrate examples of detected feature locations.
Figure 5A:
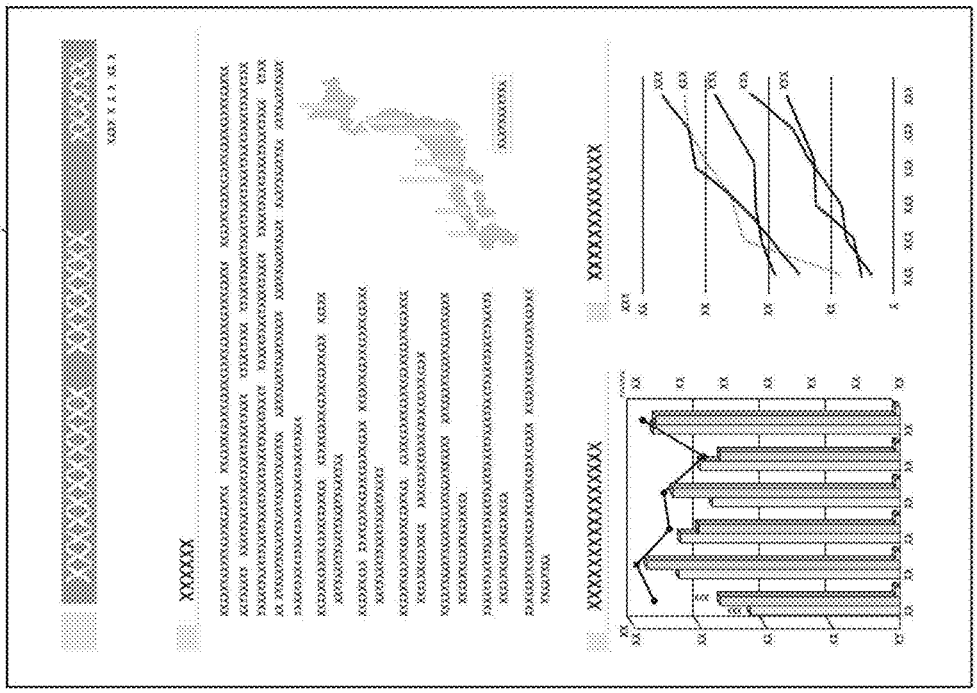

FIG. 5A and FIG. 5B illustrate examples of detected feature locations. FIG. 5A illustrates a document image A1 including characters, graphics, and a map as examples of an image target from which a feature location is detected. FIG. 5B illustrates plural feature locations (locations in circles) detected from the document image A1 by the feature location detecting unit 203. The feature location detecting unit 203 supplies feature location information indicating the detected feature locations together with the image ID of the image as the search target to the priority setting unit 206 and the feature quantity calculating unit 207.

The feature location information indicates coordinates of the feature location B1 in an XY coordinate system with the origin thereof placed at one of the corners of the document image A1. If the feature location information indicates a circular region, it may be represented by the diameter thereof. When a feature location is detected, an angle, an intensity, a detection layer, or a class ID of the feature location may be obtained, these pieces of information may be included in the feature location information.

The feature quantity calculating unit 207 calculates a feature quantity at a feature location in an image. Using the image processing technique used by the feature location detecting unit 203, the feature quantity calculating unit 207 calculates the feature quantity of each feature location. The feature quantity calculating unit 207 supplies to the image information accumulating unit 208 and the similarity determining unit 209 the calculated feature quantity together with feature location information of the feature location having served as a calculation target, and the image ID of the image serving as a calculation target.

The attribute-based region sorting unit 204 has a functionality of sorting regions in an image into plural regions having different attributes, and is an example of a "sorting unit" of the exemplary embodiment. The attribute of the region is defined by the property of a target that is an image in the region. The target may include properties (having properties representing a language, such as the alphabet, numerals, Kanji, and/or Hiragana), graphics (having properties representing a geometric shape, such as a line segment, a circle, and/or a polygon), and pictures (having properties representing existing or imaginary appearance or shape, such as a photograph, a picture, a graphic, and/or a map).

The attribute-based region sorting unit 204 sorts regions in an image into a text region where characters are displayed, a graphic region where a graphic is displayed, and a picture region where a picture is displayed. The attribute-based region sorting unit 204 sorts a region as a text region using the technique disclosed in Japanese Unexamined Patent Application Publication No. 2004-272557, sorts a region as a graphic region using the technique disclosed in Japanese Unexamined Patent Application Publication No. 2005-309862, and sorts the remaining regions other than a blank region as a picture region. Alternatively, the attribute-based region sorting unit 204 may sort each of the regions using another related art technique.

Figure 6B:
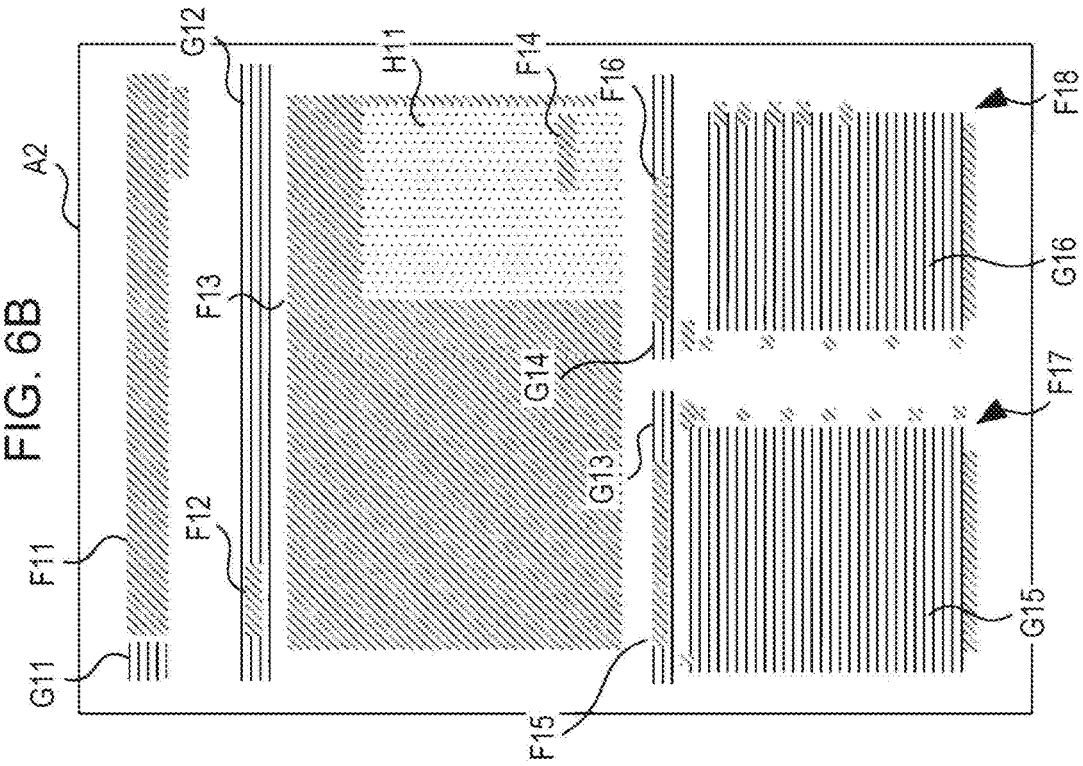
FIG. 6A and FIG. 6B illustrate examples of sorted regions.
Figure 6A:
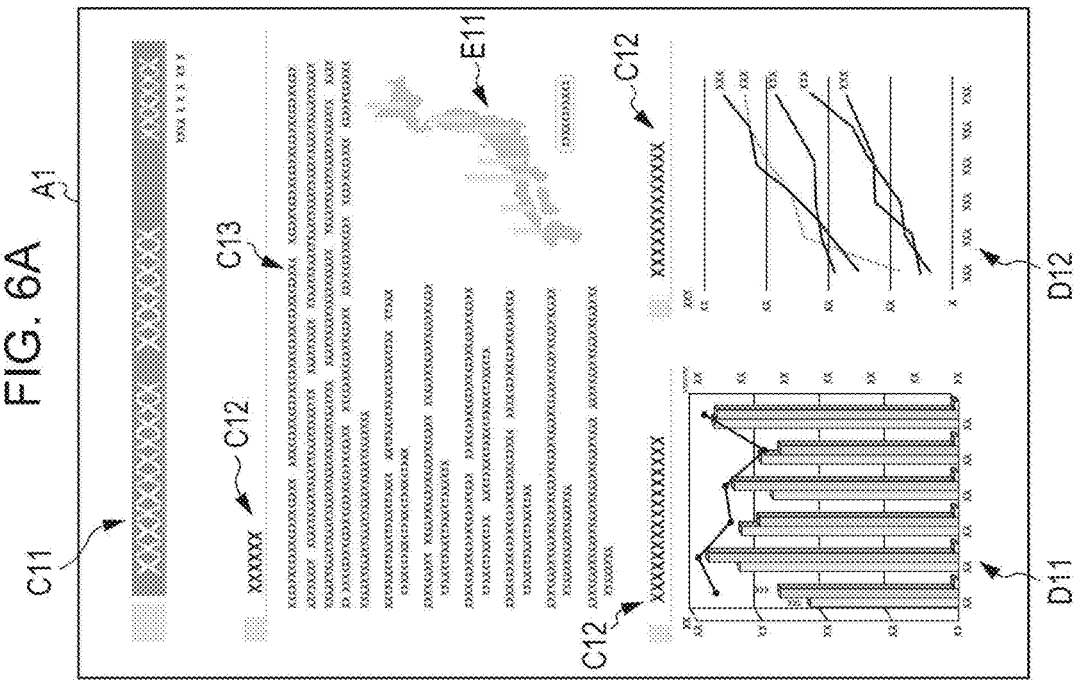

FIG. 6A and FIG. 6B illustrate examples of sorted regions. FIG. 6A illustrates the document image A1 of FIG.

5A. The document image A1 includes characters (title C11, headline C12, and contents of report C13), graphics (bar graph D11, and line graph D12), and an image (map of Japan E11). FIG. 6B illustrates a sorted region image A2 into which the attribute-based region sorting unit 204 sorts the document image A1. The sorted region image A2 includes a text region F1, a graphic region G1, and a picture region H1.

The attribute-based region sorting unit 204 sorts the title C11 into a text region F11 and a graphic region G11, and the headline C12 into a text region F12 and a graphic region G12. The attribute-based region sorting unit 204 sorts the contents of report C13 into text regions F13 and F14, and a graphic region H11, and the headline C12 into text regions F15 and F14, and graphic regions F13, and G14. The attribute-based region sorting unit 204 sorts the bar graph D11 into a graphic region G15 and a text region F17, and the line graph D12 into a graphic region G16 and a text region F18.

The attribute-based region sorting unit 204 sorts the regions in the image and supplies to the priority setting unit 206 and the image information accumulating unit 208 region area information indicating the area of the sorted region, and a region attribute identification (ID) indicating the attribute of the sorted region (such as the text region, the graphic region, or the picture region) together with an image ID of the image. The region area information is a set of formulas representing borders of each region in the XY coordinate system, for example. Alternatively, the region area information may be a set of coordinates of all pixels contained in each region in the XY coordinate system.

The image information accumulating unit 208 accumulates, as information related to an image serving as a search target (image information), a feature quantity of the image calculated by the feature quantity calculating unit 207, and the region area information of the region in the image sorted by the attribute-based region sorting unit 204. The image information accumulating unit 208 stores the feature quantity supplied from the feature quantity calculating unit 207, the feature location information, the image ID, the region area information supplied from the attribute-based region sorting unit 204, the region attribute ID, and the image ID in association with each other as long as these pieces of information have the common image ID.

The image designating operation receiving unit 101 in the user apparatus 10 receives an operation for designating an image that is similar to an image that serves as a search target (designating operation). The designating operation is performed on a screen of an application program executed by the user apparatus 10. In accordance with the exemplary embodiment, the image searching server apparatus 20 provides a webpage for image searching. The designating operation is performed on the screen of the browser displayed on the webpage by the user apparatus 10 (for example, an operation to upload an image to which an image serving as a search target is similar). The image designating operation receiving unit 101 supplies an image designated by the received operation (designated image) to the designated image transmitting unit 102 and the search result display 103. The designated image transmitting unit 102 transmits the designated image to the image searching server apparatus 20.

The image retrieval unit 202 in the image searching server apparatus 20 receives the designated image, transmitted from the user apparatus 10, as an image that serves as a calculating target for the feature quantity, and supplies the designated image to the feature location detecting unit 203 and the attribute-based region sorting unit 204. The feature location detecting unit 203 detects a feature location in the designated image using the same method described above, and supplies to the priority setting unit 206 and the feature quantity calculating unit 207 feature location information of the designated image that has been detected, and the image ID.

The feature quantity calculating unit 207 calculates the feature quantity of the designated image using the same method described above, and supplies to the similarity determining unit 209 the calculated feature quantity, the feature location information, and the image ID of the designated image. The attribute-based region sorting unit 204 sorts the regions in the designated image into plural regions different in attribute using the method described above, and supplies the region area information, region attribute ID, and image ID of the designated image to the priority setting unit 206 and the image information accumulating unit 208. The image information accumulating unit 208 accumulates these pieces of supplied information.

The priority rule memory 205 stores a rule (priority rule) that associates the attribute of the region in the image with the priority of the region. The priority rule memory 205 is an example of a "memory" of the exemplary embodiment. In accordance with the exemplary embodiment, the priority serves as an index that determines a weight attached to check results when the similarity determining unit 209 described below checks the feature locations to determine the similarity between two images.

More specifically, a higher weight is attached to the check results of the location contained in a higher priority region. In this way, as regions having a higher priority are more alike, the regions are determined to be higher similarity. In accordance with the exemplary embodiment, the priority rule memory 205 stores, as information representing the priority rule, a first priority table that associates the attribute and the priority of each region (the text region, the graphic region, and the picture region).

FIG. 7 illustrates an example of the first priority table. Referring to FIG. 7, the priority rule memory 205 stores the first priority table that associates the attributes of the regions in the image, namely, the "text region", the "graphic region", and the "picture region" with priorities of "3", "2", and "1" (with "1" indicating the highest priority and "3" indicating the lowest priority). In accordance with the exemplary embodiment, the first priority table associates the attributes of the regions in the image with the priorities of the regions. In response to a request from the priority setting unit 206, the priority rule memory 205 supplies the stored first priority table to the priority setting unit 206.

The priority setting unit 206 sets the priority of the region containing the feature locations, based on the feature locations detected from the image retrieved by the image retrieval unit 202 and the sorted regions in the image, and the priority rule stored on the priority rule memory 205. When the document image A1 of FIG. 5A is retrieved, each of the sorted regions, namely, the text regions F11 through F18, the graphic regions G11 through G16, and the picture region H11 contains feature locations.

The priority setting unit 206 receives the feature location information and image ID of the document image A1 from the feature location detecting unit 203, and receives the region area information, region attribute ID, and image ID from the attribute-based region sorting unit 204. The priority setting unit 206 sets the priority of each of the text region, the graphic region, and the picture region, each containing feature locations. More specifically, the priority setting unit 206 reads from the first priority table from the priority rule memory 205, and sets the priorities associated with the attributes of the regions in the read first priority table to be the priorities of the regions.

Referring to FIG. 7, the priority setting unit 206 sets the priority of the "picture region" to "1", the priority of the "graphic region" to "2", and the priority of the "text region" to "3". The priority setting unit 206 sets the priority associated with the attribute of the region in the image by the priority rule to the priority of the region. The priority setting unit 206 supplies priority information indicating the set priority to the similarity determining unit 209.

The similarity determining unit 209 checks the feature locations detected from two images, and determines a degree of similarity between the two images. The similarity determining unit 209 is an example of a "determining unit" of the exemplary embodiment. More in detail, the similarity determining unit 209 determines the degree of similarity by accounting for the priority of the region, which is associated by the priority rule with the attribute of the region containing the feature locations, in the check results of the feature locations.

In accordance with the exemplary embodiment, as described above, the similarity determining unit 209 determines the similarity by attaching a higher weight to the check results at a feature location having a higher priority. When the similarity determining unit 209 is supplied with a feature quantity of a designated image from the feature quantity calculating unit 207, the feature location information and the image ID, the similarity determining unit 209 reads the region area information and the region attribute ID of the designated image accumulated on the image information accumulating unit 208 in association with the image ID. The region area information and the region attribute ID of the designated image may be directly supplied from the attribute-based region sorting unit 204 to the similarity determining unit 209.

The similarity determining unit 209 selects an image as a search target from the images accumulated on the image information accumulating unit 208, and reads the feature quantity, the feature location information, the region area information, the region attribute ID, and the image ID of that image. The similarity determining unit 209 checks the feature locations against each other in the designated image read and the image as the search target, based on the read feature location information and feature quantity. In this case, based on the read region area information, and region attribute ID, the similarity determining unit 209 attaches a weight, responsive to the priority set for the attribute of the region containing each feature location, to the feature quantity of the feature location, and then determines the similarity.

In this way, even if a first feature quantity at a feature location in a region having an attribute of a higher priority is equal in size to a second feature quantity at a feature location in a region having an attribute of a lower priority, the first feature quantity is handled as being larger than the second feature quantity. For this reason, a higher similarity results when regions having attributes having a higher priority are similar to each other than when regions having attributes having a lower priority are similar to each other. Upon determining the similarity, the similarity determining unit 209 selects an image as a next search target, and determines the similarity on that image.

The similarity determining unit 209 expresses the determined similarity in a numerical value. For example, as the numerical value is closer to 0, the similarity is higher (in the case of the same images, the numerical value is 0), or as the numerical value is closer to 1, the similarity is higher (in the case of the same images, the numerical value is 1). The similarity determining unit 209 calculates the similarities on all images as the accumulated search targets. The similarity determining unit 209 supplies the determined similarities and the image IDs of the images as determination targets to the search result transmitting unit 210.

The search result transmitting unit 210 transmits, to an apparatus (the user apparatus 10) as a transmission source of the designated image, information indicating the similarity determined by the similarity determining unit 209 as search results. More in detail, when the search result transmitting unit 210 is supplied with the similarity and the image ID by the similarity determining unit 209, the search result transmitting unit 210 reads from the search target image accumulating unit 201 a URL associated with the image ID and the thumbnail image. The search result transmitting unit 210 generates search result information that associates the read URL and thumbnail image with the supplied similarity, and transmits to the user apparatus 10 the search result information as the search results of the image similar to the designated image.

The search result display 103 in the user apparatus 10 displays the search results for the designated image provided by the image searching server apparatus 20. The search result display 103 displays the designated image supplied from the image designating operation receiving unit 101. When the search result information is received from the image searching server apparatus 20, the search result display 103 displays the thumbnail images and URLs, indicated by the search result information, in the order of associated similarities from a higher value to a lower value. When the user selects a thumbnail or URL displayed, the search result display 103 accesses the URL, and retrieves and displays the image of the selected search target.

Each apparatus configured as described above in the image searching system 1 performs an image search process to search for an image similar to a designated image.

FIG. 8 illustrates an example of a procedure of each apparatuses in the image search process. In this example, an assumption is made that the feature quantity of the image serving as a search target, the feature location information, and the like have been stored. The process of FIG. 8 is triggered by an image designating operation performed by the user. The user performs the image designating operation to designate an image to which an image the user desires to search by operating the user apparatus 10 is similar. The user apparatus 10 (the image designating operation receiving unit 101) receives the image designating operation (step S11).

The user apparatus 10 (the designated image transmitting unit 102) transmits a designated image to the image searching server apparatus 20 (step S12). The image searching server apparatus 20 (the image retrieval unit 202) retrieves the designated image transmitted (step S13). The image searching server apparatus 20 (the feature location detecting unit 203) detects a feature location in the designated image (step S14). The image searching server apparatus 20 (the feature quantity calculating unit 207) calculates a feature quantity at the feature location in the designated image (step S15).

The image searching server apparatus 20 (the attribute-based region sorting unit 204) sorts regions in the designated image into plural regions different in attribute (step S16). The operation in step S16 may be performed prior to the operations in steps S14 and S15 or in parallel with each of the operations in steps S14 and S15. Based on the detected feature location and the sorted region in the designated image retrieved, the image searching server apparatus 20 (the priority setting unit 206) sets the priority of the attribute of the region containing the feature location in accordance with the priority rule (step S17).

The image searching server apparatus 20 (the similarity determining unit 209) checks the feature location detected in the designated image against the feature location in the image as the search target, and determines the similarity between the two images (step S18). The image searching server apparatus 20 (the search result transmitting unit 210) generates the search result information indicating the determined similarity (step S19), and transmits the generated search result information to the user apparatus 10 that is a transmission source of the designated image (step S20). The user apparatus 10 (the search result display 103) displays the received search results (step S21).

When the similarity between the two images is determined in the exemplary embodiment, the check targets in the two images are narrowed to the feature locations. A high-speed determination of the similarity between the images is achieved compared to the case in which all locations are checked against each other. Since the priority is set in the exemplary embodiment, the images having similar "picture regions" are determined to have a higher similarity than the images having similar "text regions" as illustrated in FIG. 7.

Even if the "text regions" in the two images look similar, it is difficult for humans to visually check the texts on a character-by-character basis. Images having similar "picture regions", which humans may visually check with more ease, have a higher degree of similarity. In accordance with the exemplary embodiment, images that appear more alike to humans have a higher similarity. The accuracy in the determination of the similarity is increased more than when the feature locations are uniformly checked. The higher the similarity is, the more the images look more alike.

Modifications

The exemplary embodiment of the present invention has been described for exemplary purposes. The exemplary embodiment may be modified as described below. The exemplary embodiment and modifications may be combined as appropriate.

Position of Region

In accordance with the exemplary embodiment, the priority used in the similarity determination is associated with the attribute of the region in the image. Alternatively, the priority may be associated with information other than the attribute. In accordance with the exemplary embodiment, the priority rule memory 205 associates the attribute of the region with the priority of the region in the image, and further stores the priority rule that associates the position of the region in the image with the priority of the region. More specifically, in addition to the first priority table of FIG. 7, the priority rule memory 205 further stores, as information representing the priority rule, a second priority table that associates the position of each region with the priority.

FIG. 9 illustrates an example of the second priority table. In the example of FIG. 9, the priority rule memory 205 stores the second priority table in which the priorities of the positions of the regions "top left", "top right or bottom left", and "bottom right" are respectively set to "1", "2", and "3". The priority setting unit 206 determines the position of the sorted regions in accordance with the region area information supplied from the attribute-based region sorting unit 204. For example, the priority setting unit 206 divides the image into four region segments of the "top left", "top right", "bottom left", and "bottom right", and determines that a region segment that contains the center of gravity of a sorted region is the position of the region.

The priority setting unit 206 sets, to be the priority of the region, the average value of the priority associated with the attributed indicated by the supplied region attribute ID in the first priority table and the priority associated with the position of the determined region in the second priority table. For example, if the region having an attribute as a "graphic region" is located in a region segment of the "top left", the priority setting unit 206 sets, to be "1.5" as the priority of the region, the average value of a priority of "2" associated with the "graphic region" in the first priority table and a priority of "1" associated with the "top left" in the second priority table.

The first priority table and the second priority table representing the priority rule stored on the priority rule memory 205 associate the attribute of the region and the position of the region in the image with the priority of the region. The similarity determining unit 209 determines the similarity using the priority set by the priority setting unit 206 in a way similar to the exemplary embodiment. The similarity determining unit 209 thus determines the similarity by accounting for the priority of the region associated with the attribute of the region containing the feature location to be checked, in accordance with the priority rule, and the priority of the region associated with the position of the region in accordance with the priority rule.

The priority rule of the modification is not limited to the one described above.

FIG. 10 illustrates another example of the second priority table. The second priority table illustrated in FIG. 10 associates the positions of the regions of the "top left", "top right or bottom left", and "bottom right" with priority correction values of "−1", "0", and "+1", respectively. A correction value of "−1" means that "1" is subtracted from the priority set in accordance with the attribute of the region, in other words, that the priority is increased by "1". A correction value of "+1" means that "1" is added to the priority set in accordance with the attribute of the region, in other words, that the priority is decreased by "1". A correction value of "0" means that the priority is not corrected.

In this case, the priority setting unit 206 corrects the priority associated with the attribute indicated by the region attribute ID in accordance with the first priority table, with the priority correction value associated with the position of the determined region in accordance with the second priority table, thereby setting the corrected value to be the priority of the region. For example, if the region having the attribute as the "graphic region" is located in the region segment of the "top left", the priority setting unit 206 corrects a priority of "2" associated with the "graphic region" in the first priority table with a priority correction value of "−1" associated with the "top left" in the second priority table, thereby setting the priority of the region to "1".

If a priority of "1" is corrected with a priority correction value of "−1", the priority may remain to be "1" without increasing the priority or the priority may be further increased to "0" which is higher in priority than "1". As with the second priority table of FIG. 9, the second priority table of FIG. 10 associates the position of the region in the image with the priority of the region (in a manner such that the priority may be increased or decreased depending on the position of the region).

In an image handled by a computer, objects within the image (characters, graphics, photographs, and pictures) are arranged from a top left corner all the way to a bottom right corner, and an object of a higher value may be arranged closer to the top left corner. An object of a higher value is typically characteristic of the image, and images with higher value objects being similar look more alike than images with other objects being similar.

In accordance with the modification, the priority associated with the position of the region is used, and the similarity of the images that look more alike is determined to be higher. The accuracy in the determination of the similarity is high compared to when the position of the region in the image is not associated with the priority of the region. The position with a higher priority may be set to be in the center of an image or in the top center of the image rather than in the top left corner of the image. A position that draws more attention of users is desirably set to be higher in priority.

Deviation in Position of Regions having Common Attribute

The priority for use in the similarity determination may be associated with information other than the information described above. In accordance with a modification, the priority rule memory 205 associates the attribute of the region in the image with the priority of the region and further stores the priority rule that associates the magnitude of a deviation in position between the regions having a common attribute in two images with the priority of each of the regions. More specifically, in addition to the first priority table of FIG. 7, the priority rule memory 205 stores, as information representing the priority rule, a third priority table that associates the magnitude of the deviation in position between the regions having the common attribute with the priority.

FIG. 11 stores an example of the third priority table. As illustrated in FIG. 11, the priority rule memory 205 stores the third priority table that sets to be respectively "1", "2", and "3" the priorities of the magnitudes of the deviations of the regions, namely, the magnitudes below threshold value Th1, the magnitudes equal to or above threshold value Th1 and below threshold value Th2, and the magnitudes equal to or above threshold value Th2. In accordance with the modification, in order to determine the similarity, the similarity determining unit 209 supplies to the priority setting unit 206 the designated image, the region area information of the image as a search target, and the region attribute ID associated therewith.

The priority setting unit 206 calculates a distance between the centers of gravity of regions indicated by the associated region area information having an identical area attribute ID, out of the region area information of the two supplied images. For example, the priority setting unit 206 calculates a distance between the centers of gravity by coordinates in the XY coordinate system. If the two images have the same size and shape, the priority setting unit 206 directly calculates the distance between the centers of gravity. If the two images are different in size or shape, the priority setting unit 206 processes the two images to the same size and shape in terms of coordinates, and then calculates the distance between the centers of gravity. It is also acceptable to calculate the distance between the centers of gravity without processing the images.

The priority setting unit 206 sets to be the priority of the region the average value of the priority associated with the attribute indicated by the region attribute ID in the first priority table and the priority associated with the calculated distance in the third priority table. For example, if each of the designated image and the image as the search target has a region having a "graphic region" attribute, and the distance between the regions is equal to or above the threshold value Vth2, the priority setting unit 206 sets to the priority of the region an average value of "2.5" of a priority of "2" associated with the "graphic region" in the first priority table and a priority of "3" associated with the "threshold value equal to or above Th2" in the third priority table. In this modification, the priority correction value may be used as illustrated in FIG. 10.

In a way similar to the exemplary embodiment, the similarity determining unit 209 determines the similarity using the priority set by the priority setting unit 206 as described above. In this way, the similarity determining unit 209 determines the similarity by accounting for the priority of the region associated with the attribute of the region containing the feature locations to be checked, in accordance with the priority rule, and the priority associated with the magnitude of the deviation of the regions in accordance with the priority rule (the magnitude of the deviation between positions of the regions having the common attribute in the two images).

There may now be two images, each having a photograph. The two photographs may be positioned at the top left portions of the images. Alternatively, one photograph may be positioned at the top left portion of one image and the other photograph may be positioned at the bottom right portion of the other image. The images in the former case look more alike. In this way, the closer the regions having the common attribute are, the images look more alike. In accordance with the modification, the priority associated with the deviation between the positions of the regions having the common attribute is used. In this way, the images looking more alike because of a smaller deviation are determined to be higher in similarity. The accuracy of the similarity to be determined is high compared to the case when the priority is not associated with the deviation.

Size of Feature Quantity of Region

The priority for use in the similarity determination may be associated with information other than the information described above. In accordance with a modification, the priority rule memory 205 associates the attribute of the region in the image with the priority of the region and further stores the priority rule that associates the size of a feature quantity at a feature location contained in the region with the priority of the region. More specifically, in addition to the first priority table of FIG. 7, the priority rule memory 205 stores, as information representing the priority rule, a fourth priority table that associates the size of the feature quantity with the priority.

FIG. 12 illustrates an example of the fourth priority table. The priority rule memory 205 stores the fourth priority table. The fourth priority table sets to be respectively "3", "2", and "1" the priorities of the sizes of feature quantities "below threshold value Th11", "equal to or above threshold value Th11 and below threshold value Th12", and "equal to or above threshold value Th12". In order to determine the similarity in the modification, the similarity determining unit 209 supplies to the priority setting unit 206 the feature quantity of the designated image, the feature location information, and the region area information.

From among the sorted regions indicated by the supplied information, the priority setting unit 206 sums the feature quantities at the feature locations contained in one region. The priority setting unit 206 sets to be the priority of the region an average value (or a median, a maximum value, or a minimum value) of the priority associated with the attribute indicated by the region attribute ID in the first priority table, and the priority associated with the calculated sum of the feature quantities in the fourth priority table.

If the designated image contains a region having a "graphic region" as an attribute, and the sum of feature quantities at feature locations contained in the region is equal to or above the threshold value Th12, the priority setting unit 206 sets to be the priority of the region an average value of "1.5" of a priority of "2" associated with the "graphic region" in the first priority table and a priority of "1" associated with "the threshold value equal to or above Th12" in the fourth priority table.

In accordance with the modification, the priority correction value may be used as illustrated in FIG. 10. In the above example, the priority is set for the region in the designated image only. A priority may be set for only an image serving as a search target. Alternatively, priorities may be set for both images. The average value of feature quantities may be calculated instead of the sum of feature quantities, or the sum of feature quantities may be calculated on a per unit area basis. It is sufficient if the priority of the region becomes higher as the feature quantity at the feature location contained in the region is increases.

In a way similar to the exemplary embodiment, the similarity determining unit 209 determines the similarity using the priority set by the priority setting unit 206 as described above. In this way, the similarity determining unit 209 determines the similarity by accounting for the priority of the region associated with the attribute of the region containing the feature locations to be checked, in accordance with the priority rule, and the priority associated with the size of the feature quantity at the feature location contained in the region in accordance with the priority rule.

A region having a larger feature quantity is considered to be a region that is characteristic of the image. As the feature quantity increases, the region looks more pronounced than other regions. Images with regions having a larger feature quantity and looking alike appear more alike than images with other regions looking alike. In accordance with the modification, the priority associated with the size of the feature quantity at the feature location contained in the region is used. The similarity of the images that look alike is determined to be high. The accuracy of the similarity to be determined is high compared to the case when the priority is not associated with the feature quantity.

Application Program Designating Image

A priority to be determined may be different depending on the type of application program (hereinafter simply referred to as "application") that is used to designate an image when a user desires to search for images similar thereto. In a modification, the designated image transmitting unit 102 transmits an application ID of an application used to designate an image, together with the designated image.

Applications used to designate images include programs for a browser, image editing, and word processing. The application ID is supplied to the priority setting unit 206 via the image retrieval unit 202. The priority setting unit 206 identifies the type of application indicated by the supplied application ID as the type of application that has been used to designate the image that serves as a determination target for similarity. The priority setting unit 206 is an example of an "identifying unit" of the exemplary embodiment.

In accordance with a modification, the priority rule memory 205 stores the priority rule on each type of application for use in image designation. The priority rule associates the attribute of the region in the image with the priority of the region.

FIG. 13 illustrates an example of the first priority table of the modification. The first priority table of FIG. 13 associates the "text region", the "graphic region", and the "picture region" as the attributes of the regions in the image with priorities of "2", "3", and "1", respectively if the type of application is "browser".

The first priority table of FIG. 13 associates the "text region", the "graphic region", and the "picture region" as the attributes of the regions in the image with priorities of "3", "2", and "1", respectively if the type of application is "image editing software". If the type of application is "text editing software", the first priority table of FIG. 13 associates the "text region", the "graphic region", and the "picture region" as the attributes of the regions in the image with priorities of "1", "2", and "3", respectively.

In the example of FIG. 13, the first priority table associates the attributes of the regions with the priorities such that the text region is set to be higher in priority than the picture region for the text editing application, and such that the picture region is set to be higher in priority than the text region for the image editing application. The text region is an example of a "first region", and the picture region is an example of a "second region" in the exemplary embodiment.

On the other hand, the priority setting unit 206 sets to be the priority of the region the priority associated with the type of application indicated by the supplied application ID and associated with the attribute of the region indicated by the region attribute ID in the first priority table. If there is a region having a text region as an attribute in the image designated using the image editing software, the priority setting unit 206 sets a priority of "3" associated with the "image editing software" and the "text region" in the first priority table.

If there is a region having a text region as an attribute in the image designated using the text editing software, the priority setting unit 206 sets a priority of "1" associated with the "text editing software" and the "text region" in the first priority table. In a way similar to the exemplary embodiment, the similarity determining unit 209 determines the similarity using the priority set by the priority setting unit 206 as described above. The similarity determining unit 209 thus determines the similarity by accounting for the priority of the region associated with the attribute of the region containing the feature locations to be checked and the type of identified application in accordance with the priority rule.

Image searching may now be performed when word processing software is used. This may be intended to use search results in the editing of text. In such a case, images that are alike in text are more useful than images that are alike in image or graphic. On the other hand, image searching may be performed when image editing software is used. This may be intended to use search results in editing images. In such as a case, images that are alike in picture (photographs, pictures, graphics, or maps) are more useful than images that are alike in text.

In accordance with the modification, the priority associated with the type of the application used to designate the image is used. The images that are more useful when the application is used are determined to be higher in similarity. With the first priority table of FIG. 13, the images that are more useful in the application are determined to be higher in similarity regardless of whether the type of the application is for editing character strings or images.

Contents of Images

In the search of similar images, a variety of contents of images including explanatory materials for conference (presentation materials), documents (reports, forms, or graphics), or photographs is designated. A priority different depending on the contents of a designated image may be determined. In accordance with a modification, a file name of a file indicating a designated image transmitted from the designated image transmitting unit 102 is supplied to the priority setting unit 206 via the image retrieval unit 202.

In accordance with the modification, the priority setting unit 206 determines the contents of the designated image. The priority setting unit 206 is an example of a "content determining unit" of the exemplary embodiment. The priority setting unit 206 determines the contents of the designated image, based on the supplied file name. If the file name of the designated image includes a file extension (such as "ppt") generated in a presentation application, the priority setting unit 206 determines that the contents of the designated image are presentation materials.

If the file name of the designated image includes a file extension (such as "xls") used in an application that is typically used to create forms (such as a spreadsheet program), the priority setting unit 206 determines that the contents of the designated image are forms. If the file name of the designated image includes a file extension (such as "dwg") used in an application that is typically used to create graphics, the priority setting unit 206 determines that the contents of the designated image are graphics. If the file name of the designated image includes a file extension (such as "doc") used in an application for document creation, the priority setting unit 206 determines that the contents of the designated image are documents (excluding forms and graphics). If the file name of the designated image includes a file extension (such as "jpg") used in photographs, the priority setting unit 206 determines that the contents are images. Alternatively, the priority setting unit 206 may determine the contents of the image using an image recognition technique in the related art (such as a technique for extracting characters, tables and borders, and persons), in place of using the file extension.

In accordance with another modification, the priority rule memory 205 stores on each content of the designated image the priority rule that associates the attribute of a region in an image with the priority of the region.

FIG. 14 illustrates an example of the first priority table of the modification. The first priority table of FIG. 14 associates the attributes of the regions as the "text region", the "graphic region", and the "picture region" with priorities of "2", "3", and "1", respectively, if the contents of the images are "explanatory materials".

The first priority table also associates the "text region", the "graphic region", and the "picture region" with priorities of "1", "2", and "3", respectively, if the contents of the images are "documents" (excluding forms and graphics). The first priority table also associates the "text region", the "graphic region", and the "picture region" with priorities of "2", "1", and "3", respectively, if the contents of the images are "forms, or graphics". The first priority table also associates the "text region", the "graphic region", and the "picture region" with priorities of "2", "3", and "1", respectively, if the contents of the images are "photographs".

In the example of FIG. 14, the attribute and priority of the region are associated with each other such that the graphic region and picture region are set to be higher in priority than the text region if the contents of the designated image are presentation materials, and such that the text region is set to be higher in priority than the graphic region and picture region if the contents of the designated image are documents excluding forms and graphics. The attribute and priority of the region are associated with each other such that the graphic region is set to be higher in priority than the text region and picture region if the contents of the designated image are forms and graphics and such that the picture region is set to be higher in priority than the text region and graphic region if the contents of the designated image are photographs. The graphic region is an example of a "third region" of the exemplary embodiment.

The priority setting unit 206 sets to be the priority of the region the priority that is associated with the contents of the image determined as described above and the attribute of the region indicated by the supplied region attribute ID in the first priority table. If the designated image determined to be the presentation materials contains a region that is determined to have a picture region as an attribute, the priority setting unit 206 sets a priority of "1" associated with the "presentation materials" and the "picture region" in the first priority table.

If the designated image determined to be the forms contains a region that is determined to have a picture region as an attribute, the priority setting unit 206 sets a priority of "2" associated with the "forms and graphics" and the "text region" in the first priority table. In a way similar to the exemplary embodiment, the similarity determining unit 209 determines the similarity using the priority set by the priority setting unit 206 as described above. In this way, the similarity determining unit 209 determines the similarity by accounting for the priority of the region that is associated with the attribute of the region containing the feature locations to be checked and the contents of the designated image in accordance with the priority rule.

When similar images are searched for, an image having the same contents as the designated image looks more alike than an image having different contents. In accordance with the modification, the priority associated with the contents of the designated image is used, and images that are more alike are determined to be higher in similarity. The accuracy of the similarity to be determined is high compared to the case when the priority is not associated with the contents of the designated image. The use of the first priority table of FIG. 14 in particular increases the accuracy of the similarity to be determined even if the contents of the designated image are any of the presentation materials, forms, graphics, or photographs.

Attribute Selection by User

A user may select an attribute of a region with a higher priority. In a modification, the image designating operation receiving unit 101 performs an operation to designate an image, while also receiving an operation to select an attribute of a region with a higher priority. For example, the selection operation for the attribute is an operation for pointing to a region of the attribute having a higher priority in the designated image (an operation for displaying a list of attributes and selecting one of the attributes may also be acceptable). The image designating operation receiving unit 101 receives the selection operation, transmits coordinate information of the indicated position and the designated image to the image searching server apparatus 20 via the designated image transmitting unit 102, and then supplies these pieces of information to the priority setting unit 206 via the image retrieval unit 202.

In accordance with the modification, if the user selects one of the attributes of a region, the priority rule memory 205 stores the priority rule that associates the attribute and the priority in a manner such that the region having the selected attribute is set to be higher in priority than other regions. For example, the priority rule is setting data that describes the highest priority for the attribute if the condition that the user has selected the attribute of the region is satisfied. If the position pointed to by the user is contained in the area of the region indicated by the region area information of the designated image supplied, the priority setting unit 206 sets the priority of the attribute of the region to "1", and sets priorities of other attributes to "2" or a higher value.

In the first priority table of FIG. 7, the priorities of the "text region", the "graphic region", and the "picture region" are set to be "3", "2", and "1", respectively. If the user now points to the "graphic region", the priority setting unit 206 sets the priority of the "graphic region" to "1", and lowers the priority of the "picture region" to "2". In this way, the similarity determining unit 209 determines the similarity by accounting for the priority of the attribute selected by the user. In accordance with the modification, the similarity is determined by maximizing the priority of the attribute of the region that the user considers as being most representative of the feature of the designated image.

Grouping Regions

If there are plural feature locations in a sorted region, those locations may be divided into plural groups. In a modification, the priority setting unit 206 compares the feature quantities of all feature locations, in an area indicated by the supplied region area information, with each other, and then divides the feature locations into plural groups different in the size of feature quantity (such as a "large-size", "medium-size", and "small-size" group). The priority setting unit 206 is an example of a "dividing unit" of the exemplary embodiment.

The priority rule memory 205 stores the priority rule that associates the attribute of the region in the image with the priority of the region on a per group basis. More specifically, the priority rule memory 205 stores, as information representing the priority rule, a fifth priority table that associates the priority with each group, in addition to the first priority table of FIG. 7.

FIG. 15 illustrates an example of the fifth priority table. The fifth priority table associates the size groups "large", "medium", and "small" with correction values of "−0.3", "0", and "+0.3", respectively. The priority setting unit 206 corrects the priority, associated with the attribute indicated by the region attribute ID in the first priority table of FIG. 7, with a priority correction value associated with the group in the fifth priority table, and sets the corrected priority as the priority of the region.

A region having a "graphic region" as an attribute may be divided into the "large-size" group. For the region, the priority setting unit 206 corrects a priority of "2" associated with the "graphic region" in the first priority table with a correction value of "−0.3" associated with "large" in the fifth priority table and sets the priority of the region to a correction result of "1.7". The similarity determining unit 209 determines the similarity by accounting for the thus-set priority, namely, the priority that is associated with the attribute of the region containing the feature locations to be checked, and the group to which the feature locations belong, in accordance with the priority rule.

Note that the sorted region may include a mixture of a location well representative of the image (a location having a larger feature quantity) and a location not well representative of the image (a location having a smaller feature quantity). On the other hand, images that are alike in locations having a larger feature quantity look more alike than images that are alike in locations having a smaller feature quantity. In accordance with the modification, the priority associated with the group different in the size of feature quantity is used, and the images that look more alike are determined to be higher in similarity. The accuracy of the similarity to be determined is high compared to the case when the priority is not associated with the group.

The grouping criteria are not limited to the size of feature quantity. For example, the priority setting unit 206 may group the feature locations according to the type of feature quantity (corners, edges, or intersections), or according to color information of each feature location. Further, the priority setting unit 206 may change the grouping criteria depending on the attribute of the region. For example, the priority setting unit 206 may group the feature locations in the text region according to the type of feature quantity, and may group the feature locations in the picture region according to the color information of each feature location.

Image Read from Printed Matter

An image obtained as a result of reading (scanning) an original document on printed matter may be used as a designated image. The image on the printed matter may be represented by a halftone screen (a pattern of small dots). If the accuracy of reading the original document is higher, relatively larger dots out of the halftone screen may be detected as a feature location.

If a print defect (such as an edition scratch or stain) is present on the printed matter, the print defect may appear on the read image and be detected as a feature location. In a modification, the similarity is determined in a manner that excludes a location specific to the printed matter and appearing in the image.

Figure 16:
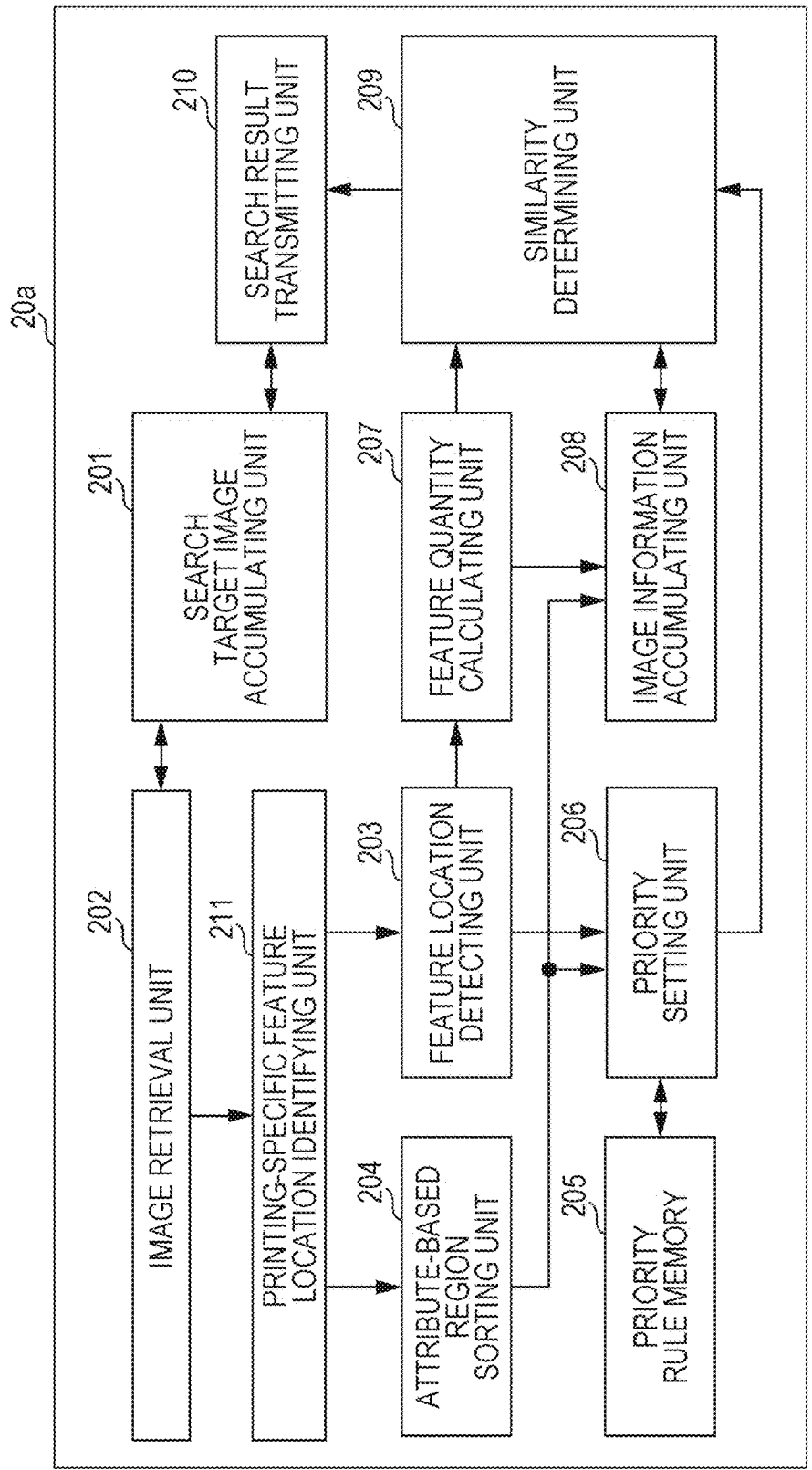
FIG. 16 illustrates a functional configuration of the image searching server apparatus as a modification of the exemplary embodiment.

FIG. 16 illustrates a functional configuration of a image searching server apparatus 20a as a modification of the exemplary embodiment. The image searching server apparatus 20a includes a printing-specific feature location identifying unit 211 in addition the elements illustrated in FIG. 4. The image retrieval unit 202 supplies the designated image retrieved and the image serving as a search target to the printing-specific feature location identifying unit 211.

The printing-specific feature location identifying unit 211 identifies a location, specific to printed matter, appearing on the image (specific location). The printing-specific feature location identifying unit 211 stores in advance relatively larger dots in the halftone screen, and a typical shape, size, and color pattern of a print defect. When the printing-specific feature location identifying unit 211 recognizes the pattern on the image, the printing-specific feature location identifying unit 211 identifies as the specific location an area where the pattern is located. The printing-specific feature location identifying unit 211 may identify the specific location using a related-art technique other than that technique.

The printing-specific feature location identifying unit 211 supplies to the feature location detecting unit 203 and the attribute-based region sorting unit 204 specific area information indicating a specific area where the identified specific location is displayed. As the region area information, the specific area information indicates the area of the specific locations using a set of formulas indicating borders of the specific locations in the XY coordinate system and. The feature location detecting unit 203 detects a feature location in an area excluding an identified specific location. The attribute-based region sorting unit 204 sorts regions in the area excluding the identified specific location in the image into plural regions different in attribute.

The priority setting unit 206 sets the priority of a region in accordance with the detected feature location, the sorted region, and the priority rule. If a location specific to the printed matter appears in an image (at least one of two images) obtained as a result of reading the printed matter, the similarity determining unit 209 determines the similarity between the two images in a manner that excludes the specific location. The specific location is not detected as a feature location. This controls the possibility that images that are not alike are determined to be high in similarity compared to when the specific location (location specific to the printed matter) is not excluded.

Layout of Image

Images having layouts thereof not alike typically look not alike. In a modification, the similarity is determined with the images having the layouts thereof not alike excluded from the search targets.

Figure 17:
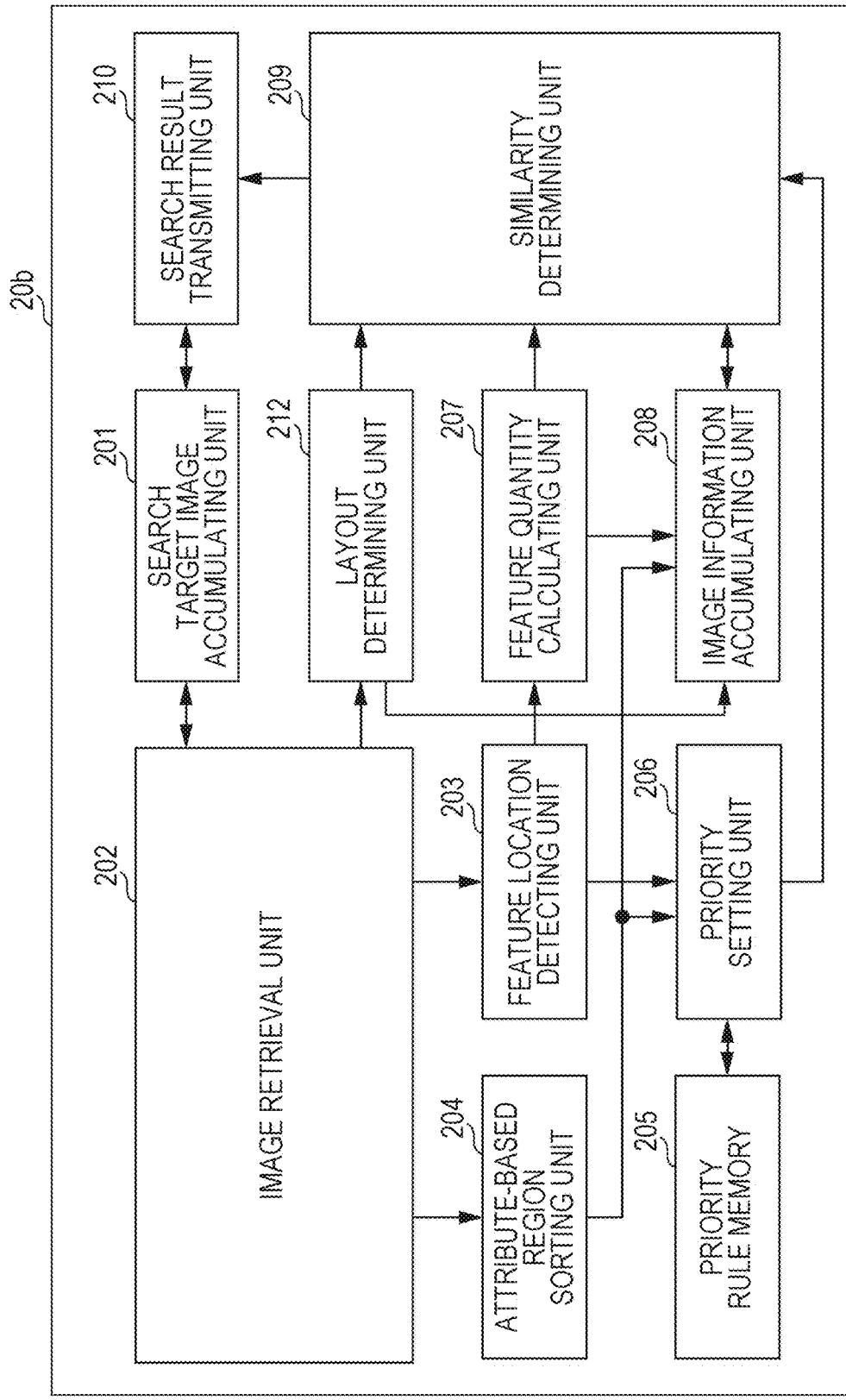
FIG. 17 illustrates a functional configuration of the image searching server apparatus as a modification of the exemplary embodiment.

FIG. 17 illustrates a functional configuration of a image searching server apparatus 20b as a modification of the exemplary embodiment. The image searching server apparatus 20b includes a layout determining unit 212 in addition to the elements of FIG. 4.

The image retrieval unit 202 supplies to the layout determining unit 212 the designated image retrieved and the image serving as the search target. The layout determining unit 212 determines the layout of the image, and is an example of a "layout determining unit" of the exemplary embodiment. The layout determining unit 212 identifies the text region, the graphic region, and the picture region using the technique performed by the attribute-based region sorting unit 204, and determines the layout of the image by referring to the shapes, sizes, and positions of the regions. The layout determining unit 212 may use a relate-art technique to detect the layout of the image.

The layout determining unit 212 supplies to the image information accumulating unit 208 and the similarity determining unit 209 layout information indicating the determined layout together with the image ID of the image as the search target. The layout information is a set of formulas indicating the borders of each region in the XY coordinate system. The image information accumulating unit 208 accumulates the supplied image ID and layout information in association with each other.

The similarity determining unit 209 determines the similarity between the two images that the layout determining unit 212 determines to be similar in layout. More specifically, the similarity determining unit 209 does not determine the similarity between the two images that are not similar in layout. For example, for the two images whose similarity is to be determined, the similarity determining unit 209 compares regions of the two images indicated by the layout information and determines that the layouts are similar if an overlapping ratio exceeds a threshold value.

If one region in one image overlaps two regions in the other image, the similarity determining unit 209 may perform a correction operation to reduce the overlapping ratio. The similarity determining unit 209 may also perform the correction operation to reduce the overlapping ratio depending on the size of an area where one region in one image overlaps a gap between regions in the other image. If the overlapping ratio of the gap between the regions in one image to the gap between the regions in the other image exceeds a threshold value, the similarity determining unit 209 may determine that the layouts are similar. The similarity determining unit 209 determines the similarity between only the designated image and image serving as the search target whose layouts are determined to be similar. In this way, time used for the similarity determination is shorter than when the similarity is determined between the designated image and each of all images serving as a search target.

Apparatus Implementing Elements

The apparatus implementing the elements of FIG. 4 is not limited to the apparatus of FIG. 4. For example, the functionalities of the user apparatus 10 and the image searching server apparatus 20 may be implemented by a single apparatus, or may be implemented by three or more apparatuses in a distributed fashion. The functionalities of the image searching server apparatus 20 may be implemented by the user apparatus.

Figure 18:
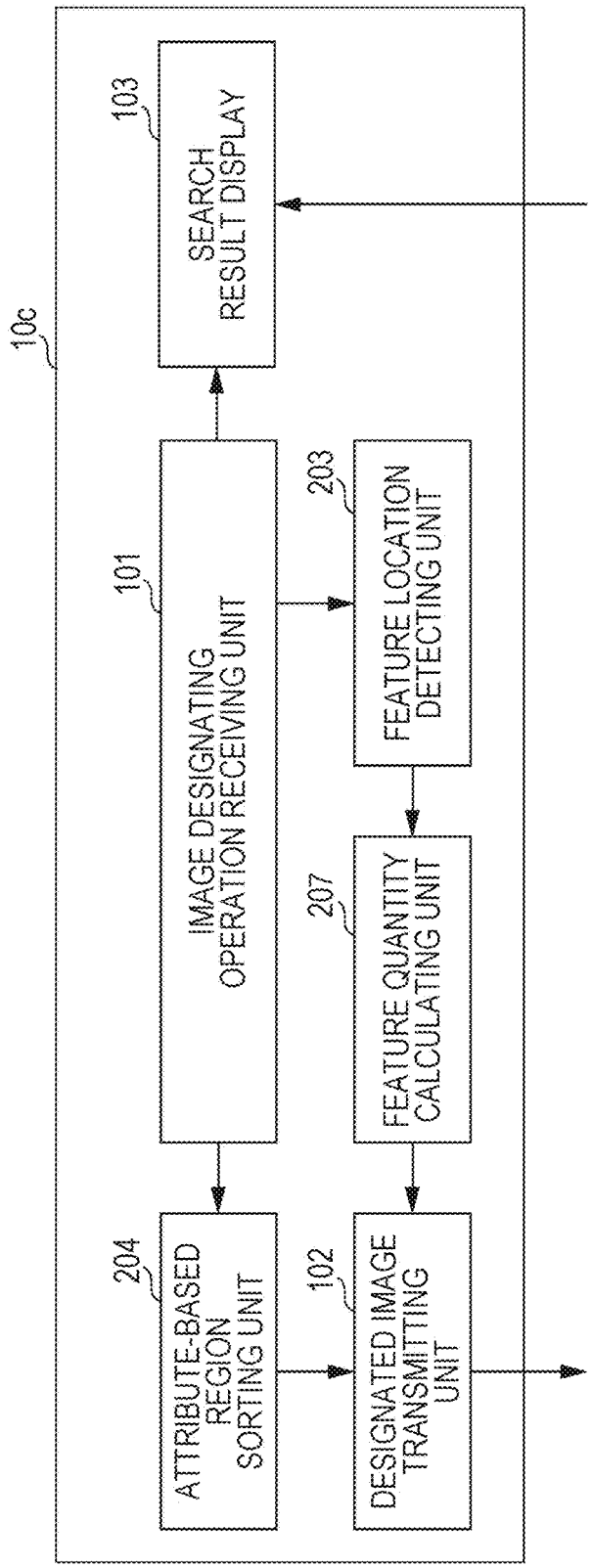
FIG. 18 illustrates a functional configuration of a user apparatus as a modification of the exemplary embodiment.

FIG. 18 illustrates a functional configuration of a user apparatus 10c as a modification of the exemplary embodiment. The user apparatus 10c includes a feature location detecting unit 203, an attribute-based region sorting unit 204, and a feature quantity calculating unit 207 in addition to the elements of FIG. 4. With these elements, the user apparatus 10c detects the feature locations, sorts the regions, and calculates the feature quantities, and transmits the results together with the designated image to the image searching server apparatus 20. As long as the elements of FIG. 4 are implemented as an image searching system, the image searching system may include any number of apparatuses, and any apparatus may implement any functionality.

Priority Rule

In accordance with the exemplary embodiment, the priority rule memory 205 stores the priority rule in advance. The present invention is not limited to this method. For example, in a modification, an external apparatus different from the image searching server apparatus 20 may store the priority rule. In order to set the priority, the priority setting unit 206 in the image searching server apparatus 20 accesses the external apparatus to read the priority rule, and temporarily stores the priority rule on a random-access memory (RAM) thereof for later use. In such a case, a storage unit, such as a RAM, storing the priority rule is an example of a "memory" of the exemplary embodiment.

The priority rule is information in a table form in each of the examples. The present invention is not limited to the table form. The priority rule may be information that is described in logic using a language (a normal language, a programming language, or a machine language). Any type of information may be used for the priority rule as long as an apparatus processing information, such as the image searching server apparatus 20, sets the priority in accordance with the rule.

Use of Priority

In accordance with the exemplary embodiment, the similarity is determined by attaching a larger weight to check results as the priority is higher. The present invention is not limited to this method. For example, the similarity determining unit 209 may exclude the check results obtained from the regions having a lower priority. In other words, the similarity may be determined by narrowing the check results to those with a priority higher than specific criteria. Alternatively, the similarity determining unit 209 may narrow the check results according to the priority, and determine the similarity by further attaching a priority-based weight to the narrowed check results. In any case, the priority is used in a manner such that the images having a higher degree of similarity appear to be more alike to a user.

Priority

In accordance with the exemplary embodiment, the priorities are represented by numerals, such as "1", "2", or "3". Alternatively, the priorities may be represented by characters, such as "A", "B", or "C", or "large", "medium", or "small". The priority may be represented on a two-level scale or a four-level scale rather than the three-level scale. The priority may be represented in any form as long as the priority is used as an index in weighting or narrowing when the feature locations are checked against each other.

The exemplary embodiment may be an information processing apparatus, such as the user apparatus or the image searching server apparatus, or an information processing system (image searching system). The exemplary embodiment may also be an information processing method to implement a process to be performed by each apparatus. In such a case, the information processing apparatus that is an entity to perform each process may be divided into plural modules. The exemplary embodiment may be a program to cause a computer to control each apparatus. The program may be distributed in the form of a recording medium, such as an optical disk, having recorded the program. Alternatively, the program may be distributed via a communication network, such as the Internet, and then downloaded to and installed on the computer for use.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a detecting unit that detects a feature location in an image;
a sorting unit that sorts regions in the image into a plurality of regions different in terms of attribute;
a memory that stores a rule that associates an attribute of a region with a priority of the region; and
a determining unit that checks the feature locations detected from two images against each other, and determines a similarity between the two images by accounting for, in check results, the priority of the region associated by the rule with the attribute of the region containing the feature locations.

2. The information processing apparatus according to claim 1, wherein the rule further associates a position of the region in the image with the priority of the region, and
wherein the determining unit determines the similarity by accounting for the priority of the region associated by the rule with the position of the region containing the feature locations to be checked.

3. The information processing apparatus according to claim 2, wherein the rule further associates a magnitude of a deviation between the positions of regions having a common attribute in the two images with the priority of the region, and
wherein the determining unit determines the similarity by accounting for the priority of the regions associated by the rule with the magnitude of the deviation between the positions of the regions containing the feature locations to be checked.

4. The information processing apparatus according to claim 3, wherein the rule further associates a size of a feature quantity of the feature location contained in the region with the priority of the region; and
wherein the determining unit determines the similarity by accounting for the priority associated by the rule with the size of the feature quantity of the region containing the feature locations to be checked.

5. The information processing apparatus according to claim 3, further comprising an identifying unit that identifies a type of an application program that has been used to designate an image that serves as a determination target for the similarity,
wherein the rule associates the attribute of the region with the priority of the region, on each type of the application program, and
wherein the determining unit determines the similarity by accounting for the priority associated by the rule with the attribute of the region containing the feature locations to be checked, and the type of the identified application program.

6. The information processing apparatus according to claim 2, wherein the rule further associates a size of a feature quantity of the feature location contained in the region with the priority of the region; and
wherein the determining unit determines the similarity by accounting for the priority associated by the rule with the size of the feature quantity of the region containing the feature locations to be checked.

7. The information processing apparatus according to claim 2, further comprising an identifying unit that identifies a type of an application program that has been used to designate an image that serves as a determination target for the similarity,
wherein the rule associates the attribute of the region with the priority of the region, on each type of the application program, and
wherein the determining unit determines the similarity by accounting for the priority associated by the rule with the attribute of the region containing the feature locations to be checked, and the type of the identified application program.

8. The information processing apparatus according to claim 7, wherein the region contains a first region where characters are displayed, and a second region where a photograph or a picture is displayed,
wherein the rule associates the attribute with the priority such that a priority of the first region is set to be higher than a priority of the second region if the application program is configured to edit a character string, and such that the priority of the second region is set to be higher than the priority of the first region if the application program is configured to edit an image.

9. The information processing apparatus according to claim 1, wherein the rule further associates a magnitude of a deviation between the positions of regions having a common attribute in the two images with the priority of the regions, and
wherein the determining unit determines the similarity by accounting for the priority of the regions associated by the rule with the magnitude of the deviation between the positions of the regions containing the feature locations to be checked.

10. The information processing apparatus according to claim 9, wherein the rule further associates a size of a feature quantity of the feature location contained in the region with the priority of the region; and
wherein the determining unit determines the similarity by accounting for the priority associated by the rule with the size of the feature quantity of the region containing the feature locations to be checked.

11. The information processing apparatus according to claim 9, further comprising an identifying unit that identifies a type of an application program that has been used to designate an image that serves as a determination target for the similarity,
   wherein the rule associates the attribute of the region with the priority of the region, on each type of the application program, and
   wherein the determining unit determines the similarity by accounting for the priority associated by the rule with the attribute of the region containing the feature locations to be checked, and the type of the identified application program.

12. The information processing apparatus according to claim 1, wherein the rule further associates a size of a feature quantity of the feature location contained in the region with the priority of the region; and
   wherein the determining unit determines the similarity by accounting for the priority associated by the rule with the size of the feature quantity of the region containing the feature locations to be checked.

13. The information processing apparatus according to claim 1, further comprising an identifying unit that identifies a type of an application program that has been used to designate an image that serves as a determination target for the similarity,
   wherein the rule associates the attribute of the region with the priority of the region, on each type of the application program, and
   wherein the determining unit determines the similarity by accounting for the priority associated by the rule with the attribute of the region containing the feature locations to be checked, and the type of the identified application program.

14. The information processing apparatus according to claim 13, wherein the region contains a first region where characters are displayed, and a second region where a photograph or a picture is displayed,
   wherein the rule associates the attribute with the priority such that a priority of the first region is set to be higher than a priority of the second region if the application program is configured to edit a character string, and such that the priority of the second region is set to be higher than the priority of the first region if the application program is configured to edit an image.

15. The information processing apparatus according to claim 1, further comprising a content determining unit that determines content of an image,
   wherein the rule associates the attribute of the region with the priority of the region on a content basis of the image, and
   wherein the determining unit determines the similarity by accounting for the priority associated by the rule with the attribute of the region containing the feature locations to be checked, and the determined content of the image.

16. The information processing apparatus according to claim 15, wherein the region contains a first region where characters are displayed, a second region where a photograph or a picture is displayed, and a third region where a graphic is displayed,
   wherein the content of the image includes a description material for a conference, a form, or a graphic, and
   wherein the rule associates the attribute with the priority such that a priority of each of the second region and the third region is set to be higher than a priority of the first region if the content includes the description material, and such that the priority of the third region is set to be higher than the priority of each of the first region and the second region if the content includes the form or the graphic.

17. The information processing apparatus according to claim 1, wherein if a user has selected one of the attributes of the regions, the rule associates the attribute with the priority such that a priority of the region having the selected attribute is set to be higher than a priority of another region.

18. The information processing apparatus according to claim 1, further comprising a dividing unit that divides the feature locations in the region into a plurality of groups different in the size of the feature quantity,
   wherein the rule associates the attribute of the region with the priority of the region on a group basis, and
   wherein the determining unit determines the similarity by accounting for the priority associated by the rule with the attribute of the region containing the feature locations to be checked, and the group to which the feature locations belong.

19. The information processing apparatus according to claim 1, wherein at least one of the two images is read from printed matter, and
   wherein the determining unit determines the similarity in a manner that excludes a location specific to the printed matter if the specific location appears in the image read from the printed matter.

20. The information processing apparatus according to claim 1, further comprising a layout determining unit that determines a layout of an image,
   wherein the determining unit determines the similarity between two images having the determined layouts similar to each other.

* * * * *